US005519170A

United States Patent [19]

Nabeshima

[11] Patent Number: 5,519,170

[45] Date of Patent: May 21, 1996

[54] CRIMPED TERMINAL WIRE HAVING A RUBBER PLUG, METHOD FOR MAKING SAME AND TOOL FOR ASSEMBLING SAME

[75] Inventor: Akira Nabeshima, Yokkaichi, Japan

[73] Assignee: Sumitomo Wiring Systems, Ltd., Mie, Japan

[21] Appl. No.: 264,371

[22] Filed: Jun. 23, 1994

[30] Foreign Application Priority Data

Jul. 6, 1993 [JP] Japan ................................ 5-042641 U

[51] Int. Cl.$^6$ ................................ H02G 15/02

[52] U.S. Cl. ................................ 174/74 R; 29/861; 29/882; 81/426; 81/426.5; 174/84 C; 439/279; 439/281; 439/877; 439/888

[58] Field of Search ................................ 174/74 R, 84 C; 439/877, 888, 889, 279, 281; 29/882, 876, 861; 81/424.5, 426, 426.5

[56] References Cited

U.S. PATENT DOCUMENTS

| | | | |
|---|---|---|---|
| 1,490,019 | 4/1924 | Neumaier . | |
| 2,789,278 | 4/1957 | Soreng . | |
| 2,789,279 | 4/1957 | Gebel . | |
| 3,123,663 | 3/1964 | Muldoon | 174/84 C |
| 3,286,223 | 11/1966 | Narozny et al. . | |
| 3,404,368 | 10/1968 | Roberts et al. | 439/866 |
| 3,990,143 | 11/1976 | Dittmann et al. | 29/628 |
| 4,214,361 | 7/1980 | Coldren et al. | 29/863 |
| 4,253,234 | 3/1981 | Niles et al. | 29/882 |
| 4,802,867 | 2/1989 | Palmer | 439/587 |
| 4,832,616 | 5/1989 | Stein, Sr. et al. | 439/279 |
| 5,025,554 | 6/1991 | Dohi | 29/860 |
| 5,090,123 | 2/1992 | Hurtgen | 29/882 |
| 5,338,233 | 8/1994 | Endo et al. | 439/877 |

FOREIGN PATENT DOCUMENTS

| | | |
|---|---|---|
| 1-909-704 | 9/1969 | Germany . |
| 3-291881 | 12/1991 | Japan . |
| 650096 | 2/1951 | United Kingdom . |
| 2-207-817 | 2/1989 | United Kingdom . |

*Primary Examiner*—Morris H. Nimmo
*Attorney, Agent, or Firm*—Oliff & Berridge

[57] ABSTRACT

A rubber plug for sealing is engaged with a covered wire, and the rubber plug is prevented from being disconnected when an insulation barrel of a terminal fitting is clamped to the plug. The insulation barrel is curved and clamped along a maximum extent of the outer circumferential surface of the rubber plug, while both end portions of the insulation barrel are overlapped. Both ends of the insulation barrel can be prevented from biting onto the surface of the rubber plug.

14 Claims, 3 Drawing Sheets

CRIMPED TERMINAL WIRE HAVING A RUBBER PLUG, METHOD FOR MAKING SAME AND TOOL FOR ASSEMBLING SAME

BACKGROUND OF THE INVENTION

The present invention relates to a wire terminal connector, and more particularly, to a crimped terminal wire having a rubber plug.

Conventionally, a thin insulated wire 30 having a rubber plug shown in FIG. 4 is inserted into a connector that is used in a place where water-proof capability is required. That is, a rubber plug 32 for sealing is engaged with a boundary portion of a core wire 31 of the thin insulated wire 30, so that a connecting portion between the insulated wire 30 and the wire insertion hole of a connector housing can be tightly sealed.

In this connection, the rubber plug 32 is made of silicon rubber and formed into a cylindrical shape. After the rubber plug 32 has been inserted with the wire 30, it is prevented by the clamping or crimping action of a terminal fitting 33 from being disconnected. As shown in FIG. 4, the conventional terminal fitting 33 includes a wire barrel 34 that clamps or crimps the core wire 31 and an insulation barrel 35 that clamps the rubber plug 32. Both ends of the insulation barrel 35 are separated and curved along an outer circumferential surface of the rubber plug 32 in the process of clamping. At this time, an appropriate crimping force is given to the insulation barrel 35, so that the rubber plug 32 is prevented from being disconnected.

In the above crimping system, the insulation barrel 35 is crimped under the condition that both ends are butted against each other. Therefore, when a crimping force is applied to the insulation barrel, both ends bite onto a surface of the rubber plug 32. For this reason, the clamping portion of the rubber plug 32 may be cracked, which could cause the wire to be damaged or disconnected, Also, the same metal terminal fitting 33 is applied to a plurality of types of wires (rubber plugs) as long as the outer diameter is in a predetermined range. Therefore, it is difficult to provide a constant clamping force. In other words, when the outer diameter of the plug is small, the insulation barrel is too big and the ends of the insulation barrel cannot apply an adequate crimping force to the plug (see FIG. 3). The critical bending radius of the clamp pieces 9*a* and 9*b* is larger than the diameter of the rubber plug, which causes the guide piece 9*b* (FIG. 3) to lose contact with the surface of the plug 3*a*. When the outer diameter of the plug is large, the insulation barrel is too small and the ends of the insulation barrel cut into the outer diameter of the plug (FIG. 5). When a sufficient crimping farce cannot be provided to the rubber plug 32 because of a mismatch between the sizes of the plug and the insulation barrel, a positional slippage is caused in the rubber plug 32 in the case where the thin insulated wire 30 is inserted into an insertion hole of the wire. When the insulation barrel 35 is clamped again, the working efficiency is remarkably decreased. The above problems are encountered in the crimping system of the prior art.

In addition, the insulation barrel is crimped onto a member made of rubber, the resilience of which is high. Essentially, it is difficult to crimp the insulation barrel to the rubber plug because of the springiness of the resilient material. As a result, an unnecessarily high crimping force tends to be applied in an effort to make up for the insufficient crimping effect.

SUMMARY OF THE INVENTION

The present invention has been achieved in the light of the above problems. It is an object of the present invention to provide a crimped terminal wire that overcomes the shortcomings of the prior art and that has a rubber plug in which the rubber plug can be securely fixed with an appropriate clamping level.

In a first aspect of the present invention, there is provided a crimped terminal wire having a rubber plug in which the rubber plug is inserted into a fore end of a thin insulating portion of a thin insulated wire and clamped by an insulation barrel of a metal fitting, the insulation barrel including end portions that are crimped onto an outer circumferential surface of the rubber plug. The insulation barrel is curved along the outer circumferential surface off the rubber plug while the end portions of the insulation barrel overlap each other.

In another aspect of the present invention, there is provided a wire terminal comprising a terminal fitting, a wire barrel coupled to the terminal fitting that is adapted to clamp an exposed region of a wire, a rubber plug having a through-bore providing a passage for an end of the wire and a crimping portion, and an insulation barrel, coupled to the wire barrel, which is adapted to provide a tight interference fit between the rubber plug and the insulating barrel, regardless of the size of the wire.

In accordance with yet another aspect of the present invention, there is provided a method for making a wire terminal comprising the steps of providing an insulating barrel with a first clamping piece and a second clamping piece; placing a crimping portion of a rubber plug between the first and second pieces; bending and conforming the first piece to the shape of the crimping portion; and bending and conforming the second piece to the shape of a first piece and the crimping portion.

In still another aspect of the present invention, there is provided an assembly tool for clamping an insulating barrel of a wire terminal to a rubber plug having a wire therethrough comprising a main body having a generally bell-shaped cross-section having a first arm and a second arm, the first and second arm having respective inner surfaces of different depths.

According to the above construction, under the condition that the insulation barrel makes maximum contact with and is curved along an outer circumferential surface of the rubber plug, and both ends of the insulation barrel are overlapped, the insulation barrel is crimped to the rubber plug, so that the entire thin insulated wire can be prevented from being disconnected.

According to the present invention, while both ends of the insulation barrel are overlapped, the rubber plug is clamped. Accordingly, both ends of the insulation barrel do not bite onto the surface of the rubber plug, so that an approximately uniform clamping force can be given onto the entire circumference of the rubber plug. With respect to wires of different diameters, the insulation barrel can be curved along the outer circumference of the rubber plug being maintained in a predetermined profile while changing the amount of overlap. Therefore, the same insulation ring can be applied to a plurality of types of wires (rubber plugs).

BRIEF DESCRIPTION OF THE DRAWINGS

The present invention will be described in detail with reference to the following drawings wherein.

DETAILED DESCRIPTION OF PREFERRED EMBODIMENTS

Figure 1:
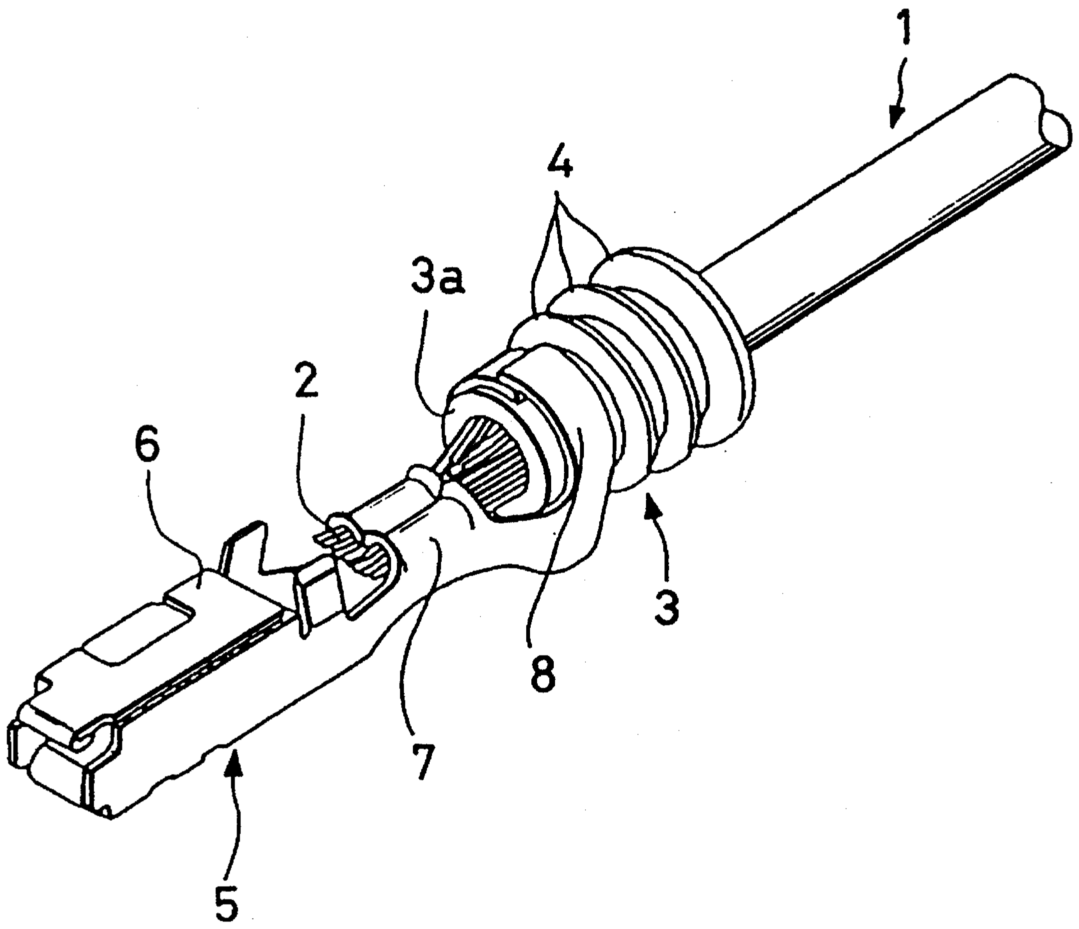
FIG. 1 is a perspective view of the covered wire having a rubber plug of the present invention.

FIG. 1 is a view showing an end portion of the thin insulated wire 1. The end portion of the thin covered wire 1 is peeled by a predetermined length so that a core wire 2 is exposed. A rubber plug 3 is provided just inside the portion where the thin covered wire is peeled. The rubber plug 3 is made of silicon or nitrile rubber, and the entire rubber plug 3 has a generally cylindrical shape. As illustrated in FIG. 1, three sealing rings 4 of an end portion of the rubber plug 3 are provided at regular intervals in such a manner that the sealing rings 4 are successively protruded in an axial direction in a flange-like manner. In addition, a crimping portion 3*a* to be clamped by a terminal fitting 5 is provided.

At a fore end of the terminal fitting 5, a contact portion 6 is provided for electrical connection. At an intermediate portion of the terminal fitting 5, a wire barrel 7 is provided for clamping or crimping the core wire 2. The wire barrel 7 is subjected to clamping deformation with respect to the core wire 2 by a well known crimping device. At a rear end of the terminal fitting 5, an insulation barrel 8 is provided.

The insulation barrel 8 includes a pair of rising clamping pieces 9*a* and 9*b*, penetrating the crimping portion 3*a* of the rubber plug. In this case, the height of the clamping piece 9*a* and that of the clamping piece 9*b* are approximately the same. Then the insulation barrel 8 is overlapped and crimped by a crimper 10 described below. In this way, the insulation barrel 8 is clamped and fixed to the crimping portion 3*a* of the rubber plug 3.

Figure 2A:
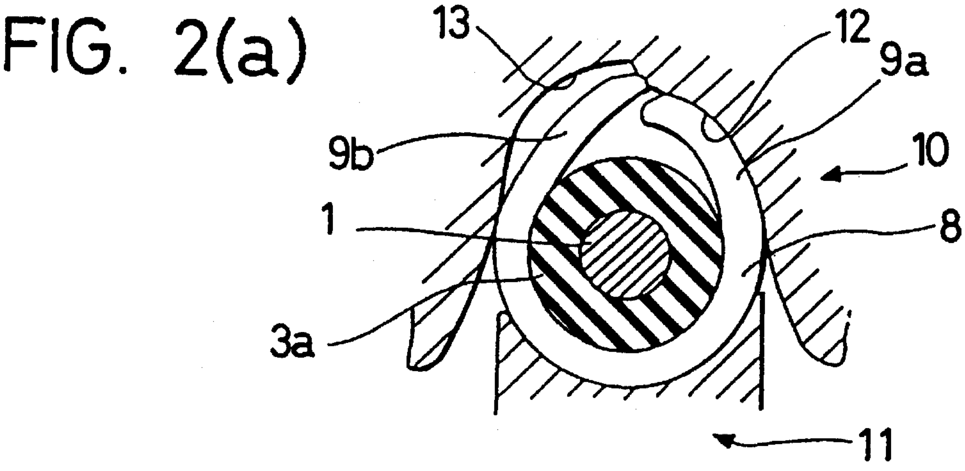
FIGS. 2(*a*)–2(*c*) are sectional views showing a sequential clamping operation of the insulation barrel.
Figure 2B:
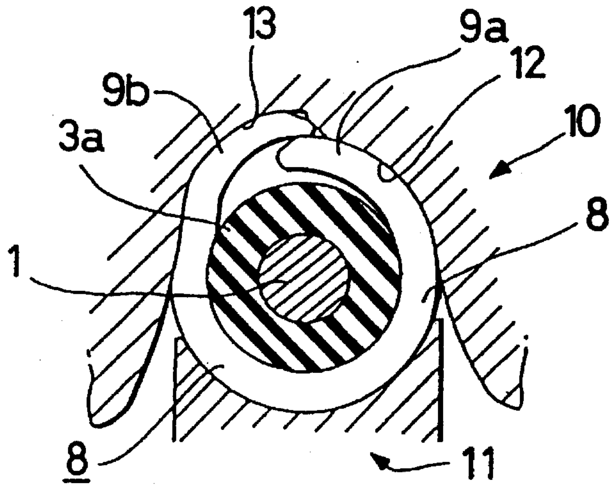
Figure 2C:
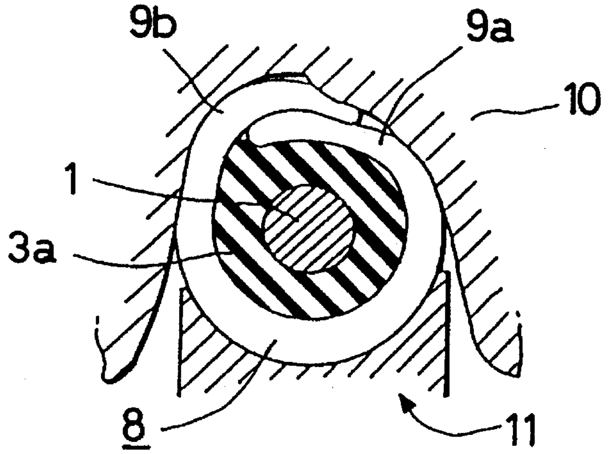
Figure 3:
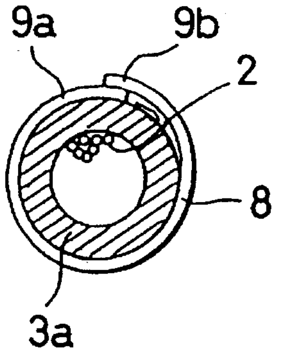
FIG. 3 RELATED ART
FIG. 3 is a sectional view showing the insulation barrel portion of the conventional covered wire.
Figure 4:
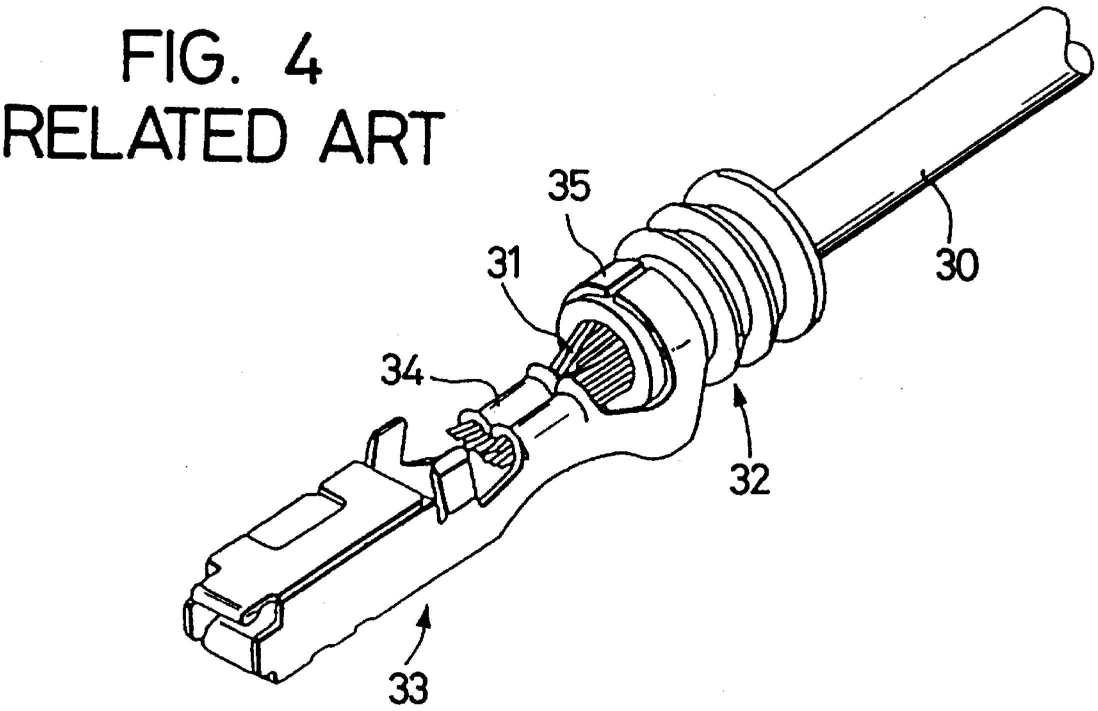
FIG. 4 RELATED ART
FIG. 4 is a perspective view showing a conventional covered wire having a rubber plug.

Clamping of the insulation barrel 8 is carried out following the sequential procedure shown in FIGS. 2(*a*)– 2(*c*). Prior to clamping of the insulation barrel 8, the thin covered wire is inserted into the rubber plug 3, and the wire barrel 7 of the terminal fitting 5 is clamped to the core wire 2.

The insulation barrel 8 is put on an anvil 11, and the crimper 10 is lowered under this condition. At this time, the first and second curved crimping surfaces 12, 13, the depths or heights of which are different, are formed on the lower surface of the crimper 10. When the crimper 10 descends, an upper end of one clamping piece 9*a* first comes into contact with the skirt portion of the first crimping surface 12 before the other clamping piece 9*b* comes into contact with its associated skirt portion. The clamping piece 9*a* on the first side is bent or conformed onto the rubber plug 3 along the first crimping surface 12. At this point in assembly, however, the other clamping piece 9*b* still does not come into contact with the second crimping surface 13.

When the crimper 10 further descends, the clamping piece 9*b*, which is on the non-contact side, comes into contact with the second crimping surface 13, so that the curving deformation is gradually started. In this connection, the anvil 11 is also moved upward synchronously with the descending motion of the crimper 10.

When the crimper 10 further approaches the anvil 11 under the condition shown in FIG. 2(*a*), the fore end of the clamping piece 9*a* is further curved to the crimping portion 3*a* of the rubber plug 3, and the other clamping piece 9*b* is curved in such a manner that the clamping piece 9*b* is overlapped on the clamping piece 9*a* and any remaining exposed regions of the rubber plug (shown in FIG. 2(*b*)). When the clamping operation advances to a condition shown in FIG. 2(*c*), the entire clamping piece 9*a* is curved and makes contact with the outer circumferential surface of the crimping portion 3*a*, and the other clamping piece 9*b* is overlapped on the clamping piece 9*a* in a predetermined range. The range and overlap depends on the size of the wire and rubber plug. Under this condition, the clamping pieces 9*a*, 9*b* are given a pressing force by the crimper 10 and anvil 11.

Figure 5:
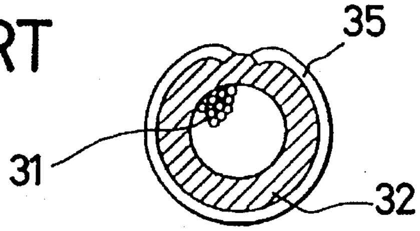
FIG. 5 RELATED ART
FIG. 5 is a sectional view showing an insulation barrel portion of the conventional covered wire.

Accordingly, both clamping pieces 9*a*, 9*b* are overlapped depending on the size of the rubber plug, so that both end portions of the clamping pieces 9*a*, 9*b* are shifted from a center line on which a pressing force is acted. Consequently, the edge portions of the clamping pieces do not bite into the rubber plug as in the related art (FIG. 5), so that the crimping portion 3*a* of the rubber plug 3 is not damaged. With respect to various wire diameters, an approximately constant fastening condition can be realized only when an amount of overlap is changed. When crimping variably sized diameter wires, however, the first and second pieces, in varying proportions, maintain contact with a maximum degree of the surface of the variable diameter rubber plug. The critical radius of the combined guide pieces always matches the (variable) radius of the rubber plug to maximize the holding function. Consequently, a stable clamping force can be provided because the frictional contact is maximized between the rubber plug and the clamping pieces.

While the invention has been described in detail with reference to preferred embodiments thereof, which are intended to be illustrative but not limiting, various changes may be made without departing from the spirit or scope of the invention. For example, in order to suppress the edge biting action, both end edges of the clamping pieces 9*a*, 9*b* may be chamfered (FIGS. 2(*a*)–(*c*)), and further the side edges may be chamfered. In order to further suppress the edge biting action, the clamping pieces 9*a*, 9*b* may also be folded outside.

What is claimed is:

1. A crimped terminal wire having a rubber plug in which said rubber plug is inserted into a fore end of a thin insulating portion of a thin insulated wire and clamped by an insulation barrel of a metal terminal fitting, said insulation barrel including end portions that are crimped onto an outer circumferential surface of said rubber plug, said insulation barrel being curved along said outer circumferential surface, the end portions of said insulation barrel being overlapped.

2. A wire terminal comprising:

a terminal fitting;

a wire barrel, coupled to said terminal fitting, and adapted to clamp an exposed region of a wire;

a rubber plug having a through-bore providing a passage for an end of said wire, said rubber plug having a crimping portion; and an insulation barrel, coupled to said wire barrel, and adapted to provide a tight interference fit between the rubber plug and the insulation barrel, regardless of the size of the wire, said insulation barrel further comprising a first clamping piece and a second clamping piece, the first and second clamping pieces being of different lengths so that the first and second clamping pieces are shifted from a centerline of said wire on which a pressing force is applied, said first and second clamping pieces overlapping as a result of said pressing force.

3. The wire terminal of claim 2, wherein the first and second clamping pieces have respective surfaces that, combined, make contact with substantially an entire perimeter of said rubber plug.

4. The wire terminal of claim 2, wherein the first and second clamping pieces define a first inner perimeter and the insulating barrel has a crimping portion having a second perimeter, the first and the second perimeters being substantially equal.

5. The wire connector of claim 2, wherein the first and second pieces comprise permanently deformable material, the first piece being overlappable with respect to the second piece so as to accommodate wires having various diameters while maintaining a tight frictional grip with a maximum degree of contact between the surfaces of the first and second pieces and the rubber.

6. The plug wire terminal of claim 2, wherein the first and second pieces have chamfered ends.

7. A wire terminal comprising:

a terminal fitting;

a wire barrel, coupled to said terminal fitting and adapted to clamp an exposed region of a wire;

a rubber plug having a through-bore providing a passage for an end of said wire, said rubber plug having a crimping portion having a diameter; and connecting means for connecting the wire barrel to the crimping portion, said connecting means including means for variably adjusting the connecting means such that the connecting means includes a structure and shape that matches the diameter of the crimping portion, regardless of the size of the crimping portion.

8. A method for making a wire terminal having a terminal fitting, a wire barrel, a rubber plug, and an insulating barrel, the method comprising the steps of:

providing the insulating barrel with a first clamping piece and a second clamping piece;

placing a crimping portion of a rubber plug between the first and second pieces;

bending and conforming the first piece to the shape of the crimping portion; and bending and conforming the second piece to the shape of the first piece and the crimping portion.

9. The method of claim 8, further comprising permanently deforming the first and second pieces so that the first and second pieces are maintained substantially in contact with the crimping portion.

10. The method of claim 8, further comprising chamfering ends of the first and second pieces to prevent the ends from biting into the crimping portion and to allow the first and second guides to slide with respect to one another during the bending steps.

11. The method of claim 8, wherein the bending and conforming of the first piece includes engaging a first end of the first piece with a first tool surface of a tool, and the bending and conforming of the second piece includes sequentially engaging a second end of the second piece with a second tool surface of said tool.

12. An assembly tool for clamping an insulating barrel of a wire terminal to a substantially round rubber plug having a wire therethrough comprising:

a main body having a general bell-shaped cross-section including a first arm and a second arm, the first and second arms having first and second respective inner surfaces, the first and second inner surfaces having different heights with an offset, the first and second inner surfaces each having a substantially round shape that matches a shape of said substantially round rubber plug such that said first and second arms are forced into a substantially round shape when a tool pressing force is applied.

13. The assembly tool of claim 12, wherein the first inner surface is adapted to engage the insulating barrel before the second inner surface engages the insulating barrel so that first and second clamping pieces of said wire terminal are overlapped and shifted from a center line on which said pressing force is applied.

14. The assembly tool of claim 12, further comprising an anvil having a cradle shape for holding the wire terminal stationary during assembly.

* * * * *